United States Patent
Osada

(10) Patent No.: US 11,687,750 B1
(45) Date of Patent: Jun. 27, 2023

(54) IMAGE PROCESSING APPARATUS, IMAGE FORMING APPARATUS, AND IMAGE PROCESSING METHOD FOR EFFICIENTLY PERFORMING IMAGE PROCESSING OF IMAGE FORMING APPARATUS IN TIME DIVISIONAL MANNER

(71) Applicant: KYOCERA Document Solutions Inc., Osaka (JP)

(72) Inventor: Yoshihiro Osada, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/728,853

(22) Filed: Apr. 25, 2022

(51) Int. Cl.
  *G06K 15/02* (2006.01)
  *H04N 1/00* (2006.01)

(52) U.S. Cl.
  CPC ..... *G06K 15/1803* (2013.01); *G06K 15/1823* (2013.01); *H04N 1/00933* (2013.01)

(58) Field of Classification Search
  None
  See application file for complete search history.

(56) References Cited

U.S. PATENT DOCUMENTS

| | | | |
|---|---|---|---|
| 5,963,911 A * | 10/1999 | Walker | G06Q 10/06 700/99 |
| 6,332,170 B1 * | 12/2001 | Ban | G06F 3/1205 358/437 |
| 6,921,220 B2 | 7/2005 | Aiyama | |
| 2005/0065894 A1 * | 3/2005 | Inaba | G06Q 30/0283 705/400 |
| 2007/0052992 A1 * | 3/2007 | Yamada | G06F 3/125 358/1.16 |
| 2012/0050792 A1 * | 3/2012 | Uozumi | H04N 1/2369 358/1.15 |
| 2018/0373562 A1 * | 12/2018 | Roberts | G06F 9/4887 |
| 2019/0057484 A1 * | 2/2019 | Iwamoto | G06F 9/4881 |
| 2020/0201635 A1 * | 6/2020 | Ito | G06F 3/1244 |

* cited by examiner

*Primary Examiner* — Miya J Williams
(74) *Attorney, Agent, or Firm* — Hawaii Patent Services; Nathaniel K. Fedde; Kenton N. Fedde

(57) ABSTRACT

Provided is an image processing apparatus that efficiently performs time-divisional image processing tasks related to image formation of an image forming apparatus. A time division determination unit configured to determine and switch which of divided work items to execute based on execution time in a condition where at least one first task to be processed at a specific pace and at least one second task to be processed at best effort are respectively divides into smaller work items. A task execution unit executes the work item switched by the time division determination unit in a time division. This work item uses something as like first band data and second band data.

9 Claims, 5 Drawing Sheets

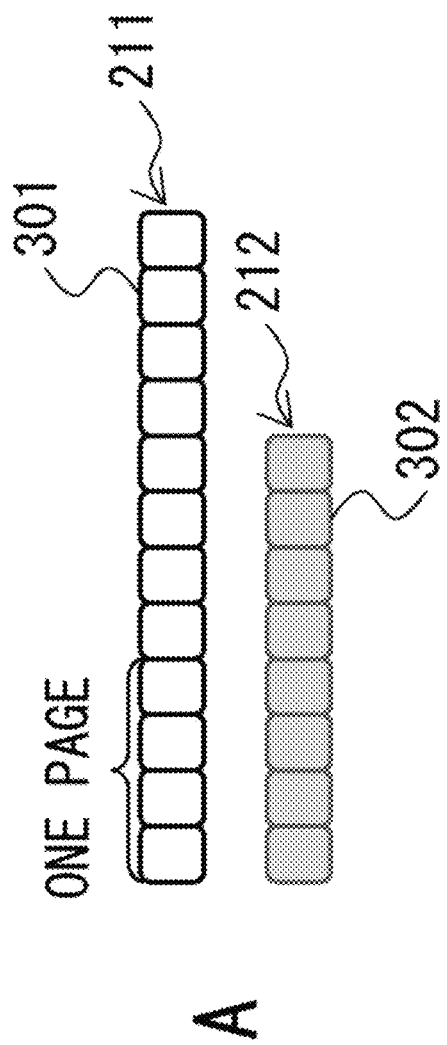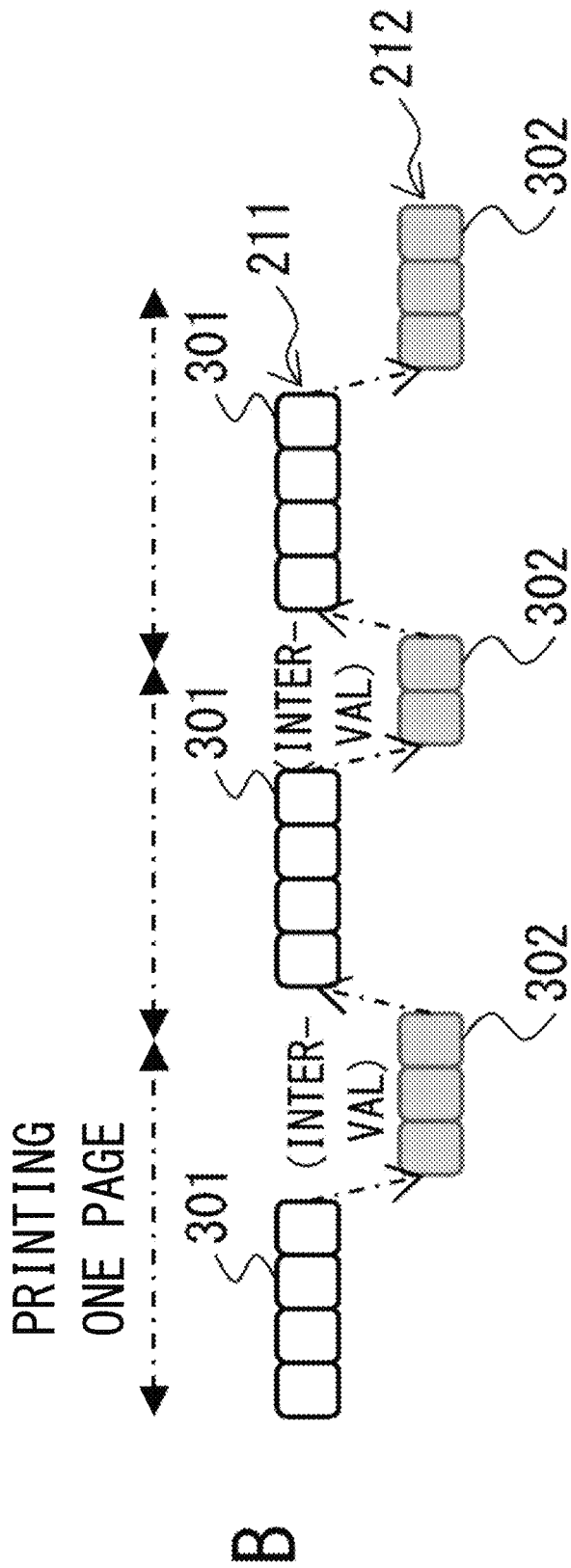

IMAGE PROCESSING APPARATUS, IMAGE FORMING APPARATUS, AND IMAGE PROCESSING METHOD FOR EFFICIENTLY PERFORMING IMAGE PROCESSING OF IMAGE FORMING APPARATUS IN TIME DIVISIONAL MANNER

BACKGROUND

The present disclosure relates to an image processing apparatus, an image forming apparatus, and an image processing method, and more particularly to an image processing apparatus, an image forming apparatus, and an image processing method for performing image processing related to image formation of the image forming apparatus.

There is an image forming apparatus such as multifunctional peripheral (MFP) that can print documents and images.

As a system including a typical image forming apparatus, an image processing system in which a data processing apparatus and a plurality of image processing apparatus are connected via a network is disclosed. A data processing apparatus transmits a print job received from the client via the network and a first instruction data instructing to calculate print cost of the print job to each of a plurality of the image processing apparatuses. The image processing apparatus responds to the reception of the print job and the first instruction data from the data processing apparatus, and it calculates the printing cost based on the image processing capability of the apparatus itself.

SUMMARY

An image processing apparatus according to the present disclosure is an image processing apparatus that performs image processing related to image formation of an image forming apparatus, including: a time division determination unit that determines and switches which of divided work items to execute based on execution time in a condition where at least one first task to be processed at a specific pace and at least one second task to be processed at best effort are respectively divides into smaller work items; and a task execution unit that executes the work item switched by the time division determination unit in a time division manner.

An image forming apparatus according to the present disclosure is an image forming apparatus including: a time division determination unit that determines and switches which of divided work items to execute based on execution time in a condition where at least one first task to be processed at a specific pace and at least one second task to be processed at best effort are respectively divides into smaller work items; a task execution unit that executes the work item switched by the time division determination unit in a time division manner; and an image forming unit that forms an image based on output data generated from the work item of the first task processed by the task executing unit.

An image processing method of the present disclosure is an image processing method executed by an image processing apparatus that performs image processing related to image formation of an image forming apparatus, and the image processing apparatus executes the steps of: determining and switching which of divided work items to execute based on execution time in a condition where at least one first task to be processed at a specific pace and at least one second task to be processed at best effort are respectively divides into smaller work items; and executing the switched work item in time division.

BRIEF DESCRIPTION OF THE DRAWINGS

FIG. 5 is a conceptual diagram of task switching in the time-division task execution process as shown in FIG. 3.

DETAILED DESCRIPTION

Embodiment

[System Configuration of Image Forming Apparatus 1]

Figure 1:
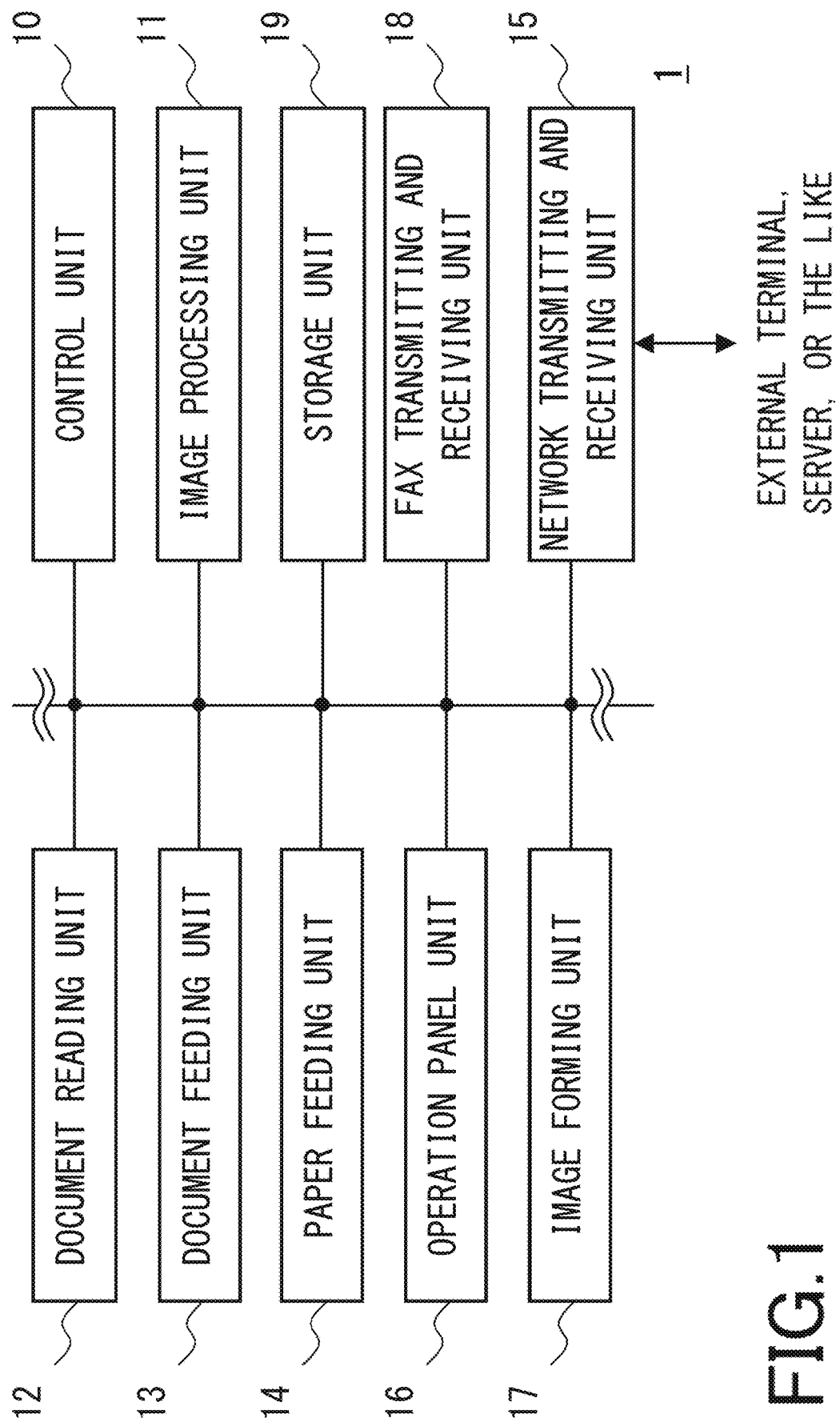
FIG. 1 is a system configuration figure of an image forming apparatus according to an embodiment of the present disclosure.

First, with reference to FIG. 1, a system configuration of an image forming apparatus 1 is described.

The image forming apparatus 1 includes a control unit 10, an image processing unit 11, a document reading unit 12, a document feeding unit 13, a paper feeding unit 14, a network transmitting and receiving unit 15, an operation panel unit 16, and an image forming unit 17, a FAX transmitting and receiving unit 18, a storage unit 19, and the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), or the like.

The control unit 10 controls the entire apparatus according to instruction information input from an external terminal or an operation panel unit 16.

In the present embodiment, the control unit 10 acquires a job from an external terminal, a server, a document reading unit 12, or the like, performs RIP (Raster Image Processer), and generates image data. In this case, function of the RIP accelerator by the image processing unit 11 may be used.

The image processing unit 11 is a control calculation unit such as a GPU (Graphics Processing Unit), a DSP (Digital Signal Processor), an ASIC (Application Specific Integrated Circuit), or the like. The image processing unit 11 performs various image processing on the image data.

These various image processes may be, for example, as processes necessary for forming and outputting an image by the image forming unit 17. Specifically, the various image processes may be, for example, enlargement/reduction, density adjustment, gradation adjustment, image improvement, halftone (dithering), and the like (hereinafter, these processes are simply referred to as "halftone process"). This halftone process may be a process for preparing image data to be printed immediately before image formation by the image forming unit 17. In this case, the halftone process may be performed the same process on the entire image data. Therefore, in this halftone process, the image processing unit 11 may be able to execute one processing in parallel on a large number of calculation nodes, such as a SIMD (Single Instruction/Multiple Data) calculation. Even in this case, the image processing unit 11 may execute a process for executing one code (program) (hereinafter, referred to as a "task") at the same time.

Here, in the present embodiment, the image processing unit 11 may be configured to execute one halftone process as a task at a time. Therefore, when a plurality of tasks is executed as like simultaneously in parallel, the image processing unit 11 may be configured to be switched it in a time division manner as described later. Specifically, as is described later, there is a case where the image processing unit 11 is desired to be used for processing other than the normal printing process. For example, it is a case or the like, that a printing cost estimation process is performed other than the normal printing process. In the present embodiment, the image processing unit 11 can execute a plurality of tasks in a time-division manner in such a case. Here, the tasks may be executed in order on a first-in, first-out basis.

Further, in the present embodiment, an example in which the image processing unit 11 is mainly a programmable control calculation unit such as a GPU, DSP, or the like, is described.

In addition, the image processing unit 11 can also store the image read by the document reading unit 12 in the storage unit 19 as a job. At this time, the image processing unit 11 may convert the print data into an electronic document such as PDF, or the like, or an image data file such as TIFF, or the like. Further, the image processing unit 11 may have a RIP accelerator function for the control unit 10. Further, the image processing unit 11 may be capable of executing at least a part of OCR (Optical Character Recognition) processing.

The control unit 10 and the image processing unit 11 read out the control program stored in the ROM or HDD of the storage unit 19, expand the control program in the RAM, and execute it. As a result, it can be operated as each part of the functional block as described later.

The document reading unit 12 reads the set document. Further, the document reading unit 12 is arranged on the upper part of the main body part of the image forming apparatus 1.

The document reading unit 12 includes a scanner, a platen glass, and a document reading slit. When reading a document placed on the platen glass, the document reading unit 12 moves the scanner to a position facing the platen glass and scans the document placed on the platen glass to obtain image data. The document reading unit 12 stores the acquired image data in the storage unit 19.

Further, when the document reading unit 12 reads the document supplied from the document feeding unit 13, the document reading unit 12 moves the scanner to a position facing the document reading slit. Then, the document reading unit 12 reads the document through the document reading slit in synchronization with the document transport operation by the document feeding unit 13 to acquire image data. The document reading unit 12 stores the acquired image data in the storage unit 19.

The document feeding unit 13 conveys the document read by the document reading unit 12. The document feeding unit 13 is arranged above the document reading unit 12.

The document feeding unit 13 includes a document placing unit and a document transporting mechanism. The document feeding unit 13 feeds the documents placed on the document placing unit one by one by the document transport mechanism and feeds them to the document reading unit 12.

The paper feeding unit 14 feeds the recording paper one by one toward the image forming unit 17. The paper feed unit 14 is provided in the main body part.

The network transmitting and receiving unit 15 is a network connection unit including a LAN board, a wireless transceiver, and the like, for connecting to an external network. The external network of the present embodiment is, for example, a LAN, a wireless LAN, a WAN, a mobile phone network, a voice telephone network, or the like.

The network transmitting and receiving unit 15 transmits/receives data on a data communication line, and it transmits/receives a voice signal on a voice telephone line.

The network transmitting and receiving unit connects to the external terminal, a server, or the like (hereinafter, simply referred to as "terminal or the like") via this external network, receives the job, and transmits a processing result.

The operation panel unit 16 includes an input unit such as a button, a touch panel, or the like, and a display unit such as an LCD (Liquid Crystal Display), an organic EL display, or the like. Further, the operation panel unit 16 is arranged on the front side of the image forming apparatus 1.

The buttons of the input unit of the operation panel unit 16 are a numeric keypad, a start button, a cancel button, an operation mode switching button, a button for instructing job execution, and the like. This operation mode may include modes such as copying, fax transmission, a scanner, and a network scanner, or the like. Further, in the present embodiment, the types of jobs are printing, transmission, storage, recording, and the like, for the selected document. Further, in the present embodiment, it is also possible to instruct the job for estimating the printing cost first in printing, or the like.

The input unit of the operation panel unit 16 acquires instructions for various jobs of the image forming apparatus 1 by a user. Further, it is also possible to input and change the information of each user according to the user's instruction acquired from the operation panel unit 16.

The image forming unit 17 forms an image on a recording paper from the data stored in the storage unit 19, read by the document reading unit 12, or acquired from the external terminal, or the like, according to the user's output instruction.

The image forming unit 17 includes a photoconductor drum, an exposed unit, a developing unit, a transfer unit, a fixing unit, and the like. The image forming unit 17 records a toner image on a recording paper by executing an image forming process including charging, exposure, development, transfer, and fixing.

The FAX transmitting and receiving unit 18 transmits/receives a facsimile. The FAX transmitting and receiving unit 18 can receive a facsimile from another FAX apparatus via a voice line, store the fax in the storage unit 19, and cause the image forming unit 17 to form an image. Further, the FAX transmitting and receiving unit 18 can convert the document read by the document reading unit 12, the network FAX data transmitted from the terminal, or the like, into image data and facsimile-transmit to another FAX apparatus by the voice line.

The storage unit 19 is a non-transitory recording medium including a semiconductor memory such as a ROM (Read Only Memory) or a RAM (Random Access Memory), or the like, or an HDD (Hard Disk Drive), or the like.

The RAM of the storage unit 19 may keep the stored contents by a function such as self-refresh even in a power saving state.

A control program for controlling the operation of the image forming apparatus 1 is stored in the ROM or HDD of the storage unit 19. This control program includes an OS (Operating System) executed by the control unit 10, application software (hereinafter, simply referred to as "application"), middleware for performing RIP, and the like. Further, this control program includes code data 220 (FIG. 2) to be executed by the GPU, or the like, of the image processing unit 11.

In addition to this, the storage unit 19 may also store the user's account settings. Further, the storage unit 19 may include an area of a storage folder for each user.

In addition, the control unit 10 and image processing unit 11 may be integrally formed such as a CPU having built-in GPU, a chip-on-module package, an SOC (System On a Chip), and the like.

Further, the control unit 10 and the image processing unit 11 may have a recording medium such as a RAM, a ROM, or a flash memory. This recording medium may be the cache memory of the storage unit 19, or it may be used as a local memory having an address space, or the like, different from the address space of the storage unit 19.

[Functional Configuration of Image Forming Apparatus 1]

Figure 2:
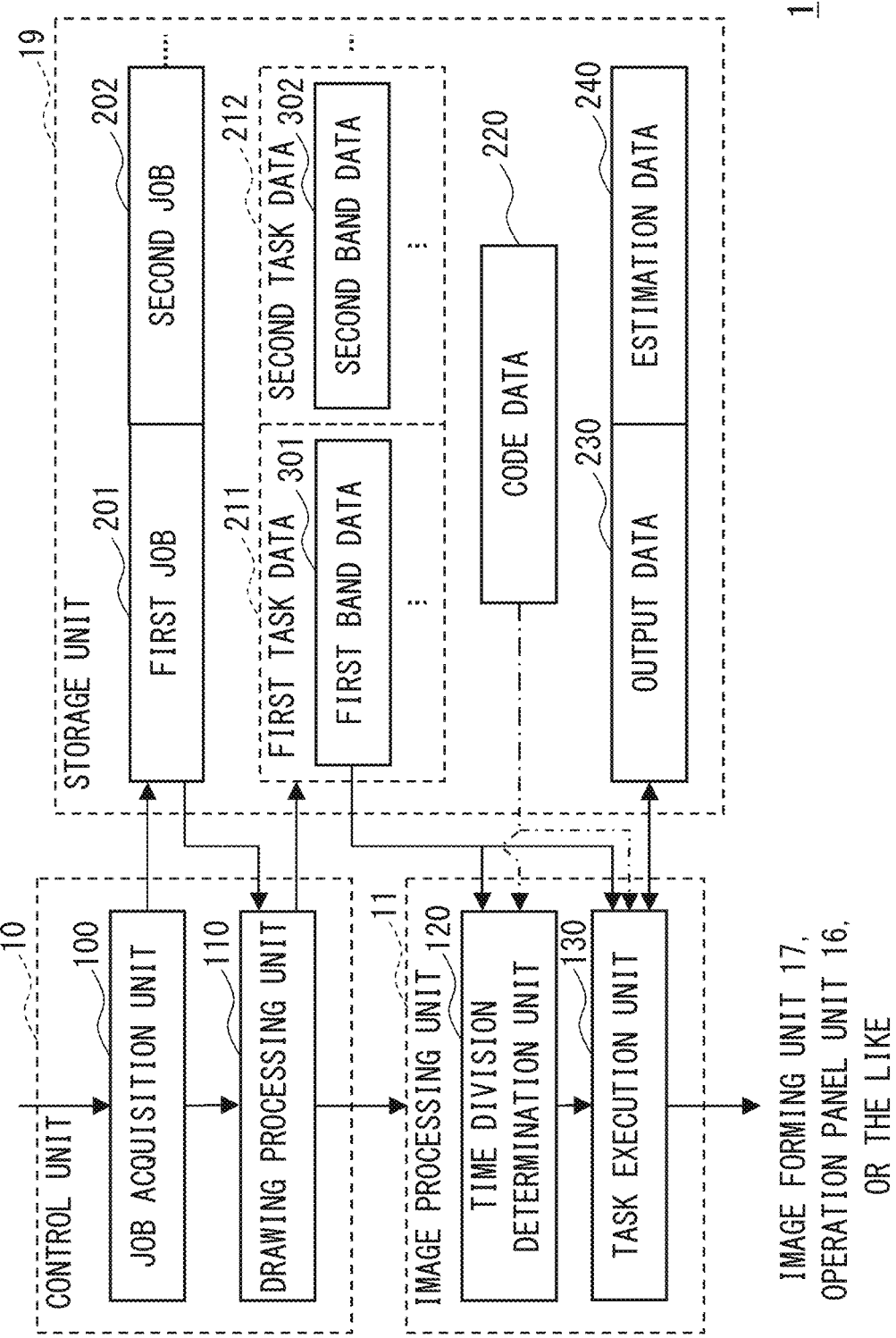
FIG. 2 is a block diagram showing a functional configuration of the image forming apparatus as shown in FIG. 1.

Here, with reference to FIG. 2, the functional configuration of the image forming apparatus 1 is described.

The control unit 10 of the image forming apparatus 1 includes a job acquisition unit 100 and a drawing processing unit 110.

The image processing unit 11 includes a time division determination unit 120 and a task execution unit 130.

The storage unit 19 stores a first job 201, a second job 202, a first task data 211, a second task data 212, a code data 220, an output data 230, and an estimation data 240.

The job acquisition unit 100 acquires various jobs from the terminal, or the like, or a document reading unit 12. In the present embodiment, the job acquisition unit 100 acquires the first job 201 and the second job 202, which are described later, and stores them in the storage unit 19.

The drawing processing unit 110 processes the RIP of the job. In the present embodiment, the drawing processing unit 110 performs RIP the first job 201 and the second job 202 to generate the first task data 211 and the second task data 212, respectively.

The time division determination unit 120 switches to at least one first task and at least one second task, which are corresponding to the first task data 211 and the second task data 212, respectively.

Here, in the present embodiment, both the first task and the second task are processes related to printing. In the present embodiment, an example is described in which the first task is a normal print processing task and the second task is a printing cost estimation processing task.

Here, in the present embodiment, the processing procedure of the first task and the second task is the same, and only the parameters at the time of execution may be different. Specifically, the first task and the second task may be configured such that the same code data 220 is executed by the image processing unit 11 with different parameters.

In the present embodiment, the time division determination unit 120 may divide the first task and the second task into smaller work items, and it may determine and switch which of the divided work items to execute based on the execution time. Specifically, the time division determination unit 120 divides, for example, the first task data 211 and the second task data 212 into a plurality of first band data 301 and second band data 302 as work items, respectively. In this example, the time division determination unit 120 determines and switches which of the plurality of first band data 301 or the second band data 302 is to be processed based on the execution time and the timing.

Further, in the present embodiment, the time division determination unit 120 may select the second task as long as it is in an interval between the executions of the processing for the first band data 301 of the first task. Specifically, the interval between these executions may be, for example, between printing pages. In this case, the time division determination unit 120 switches to execution of processing the first band data 301 for the first task at the timing when the page printing is not delayed after execution of the processing of the second band data 302 for the second task.

The task execution unit 130 executes the work item switched by the time division determination unit 120 in a time division manner. In the present embodiment, the task execution unit 130 executes processing for the first band data 301 of the first task or processing for the second band data 302 of the second task.

Further, in the present embodiment, the image forming unit 17 forms an image based on the output data 230 generated from the work item of the first task processed by the task executing unit 130. In the case of a print job, the image forming unit 17 prints the output data 230 on the recording paper.

The first job 201 is job data for the first task. In the present embodiment, an example is explained that the first job 201 is a normal print job. Specifically, the first job 201 may be vector data of page units described in PDL (Page Description Language). Alternatively, the first job 201 may be PS (Postscript) data, PDF data, files of various applications, or the like (hereinafter, simply referred to as "PDL data, or the like"). On this basis, the first job 201 may be added with data of an instruction for performing normal printing.

The second job 202 is job data for the second task. In the present embodiment, an example is explained that the second job 202 is a job for estimating the printing cost. Specifically, the second job 202 may also be PDL data, or the like. In this case, the second job 202 is not printed itself, and only the estimation of the printing cost is acquired as a result.

The first task data 211 is data of the first task generated based on the first job 201 and processed at a specific pace (time interval). In the present embodiment, an example of the first task is explained as a normal printing process task that is processed at the specific pace. The task of this printing process includes a halftone process for the first band data 301 in the image processing unit 11, an image forming process for the output data 230 after the halftone process in the image forming unit 17, or the like. Here, the "specific pace" in the first task may be, for example, a constant pace associated with printing by the image forming apparatus. Specifically, the specific pace may be based on the speed of image formation of the image forming unit 17, that is, based on the print time of each next page before and after the first page is printed. In this way, a specific pace may be specified at a different pace depending on the page type and the stage of processing.

The second task data 212 is data of the second task generated based on the second job 202 and processed at best effort. In the present embodiment, an example is explained that this second task is a task of printing cost estimation process, which is processed by the image processing unit 11 at best effort. In the task of estimating the printing cost, the image processing unit 11 performs halftone processing on the second band data 302 in the same manner as the first task. However, only the value of the count result as described later is stored in the estimation data 240, and it is not output to the image forming unit 17. Here, at the "best effort" in the second task, it is not necessary to process at a constant pace, and it may be as soon as possible. That is, in the present embodiment, the first task is prioritized and executed at the specific pace, and the second task is executed a best effort so as not to delay the first task. More specifically, for example, the second task data 212 may be executed as much as possible during the interval between the executions of the first task, that is, the waiting time between the processing of each first band data 301 of the first task.

Furthermore, the data formats of the first task data 211 and the second task data 212 may be the same. In the present embodiment, an example in which the first task data 211 and the second task data 212 are both raster image data (hereinafter, simply referred to as "image data") as performed RIP intermediate processing data is described. For example, the first task data 211 and the second task data 212 may be bitmap data of 8 to 16 bits for each color of RGB (Red, Green, and Blue).

Further, the first task data 211 and the second task data 212 may be divided into a plurality of the first band data 301 and a plurality of the second band data 302, respectively. That is, the first task data 211 and the second task data 212 are examples of processing units of work items according to the present embodiment. Further, the first band data 301 and the second band data 302 may be bitmap data of the "band" that can be image-formed at once by the image forming unit 17. Also, the first band data 301 and the second band data 302 may or may not be compressed by lossless compression or lossy compression.

The code data 220 is a file, or the like, including the code and data to be executed by the image processing unit 11. Specifically, the code data 220 may be code data as like to be specialized in matrix operations and logical operations that can execute routine processing on a large amount of data at high speed. Further, the code data 220 may be data described in, for example, Open CL, CUDA (registered trademark), Fortran, assembler, or other dedicated language. Of these, the code data 220 is preferably described in a language that can be executed by a general-purpose GPU, for example, Open CL, or the like. Further, the code data 220 may be held as source data in a high-level language and compiled or the like, at the time of execution, may be in an intermediate language format, or may be compiled binary data in an execution format. In this binary format, SIMD operations may be directly executable.

The output data 230 is image data in which the first band data 301 of the first task is image-processed and is to be image formed by the image forming unit 17. Specifically, the output data 230 may be, for example, color-converted binary bitmap image data, or the like, after halftone process. In this case, the output data 230 may be difficult to compress. Therefore, if the output data 230 continues to be stored in the storage unit 19, it consumes a large number of resources such as a storage capacity. Thus, the output data 230 may be deleted after the output.

The estimation data 240 is data calculated based on the image processing of all the second band data 302 of the second task. In the present embodiment, an example that the estimation data 240 is data of "estimation of printing cost", which the consumption of toner or ink, the power consumption, or the consumption of recording paper and other consumables are calculated based on the number of dots (pixels) printed out (hereinafter, simply referred to as "count"). The estimation data 240 may be transmitted to a terminal, or the like, as a reply to the second job 202.

Here, the control unit 10 is made to function as the job acquisition unit 100 and the drawing processing unit 110 by executing the control program stored in the storage unit 19.

The image processing unit 11 is made to function as the time division determination unit 120 and the task execution unit 130 by executing the code data 220 as the control program.

Further, each part of the above-mentioned image forming apparatus 1 becomes a hardware resource for executing the image processing method of the present disclosure.

In addition, a part or any combination of the above-mentioned functional configurations may be configured in terms of hardware or circuit by IC, programmable logic, FPGA (Field-Programmable Gate Array), or the like. Also, the process related to the time division determination unit 120 and the task execution unit 130 may be executed by the same circuit as executed the code data 220 as described above.

[Time-Division Task Execution Process by Image Forming Apparatus 1]

Figure 3:
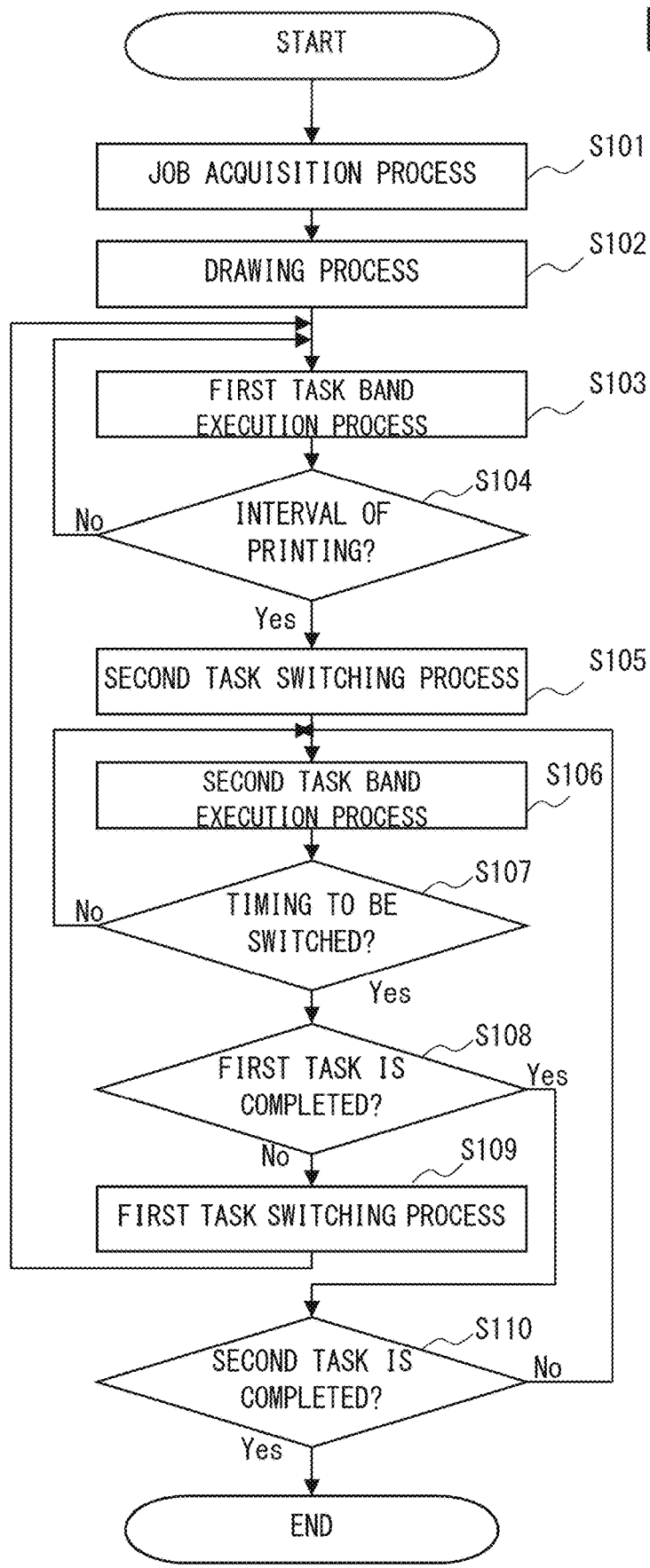
FIG. 3 is a flowchart of the time-division task execution process according to the embodiment of the present disclosure.
Figure 4:
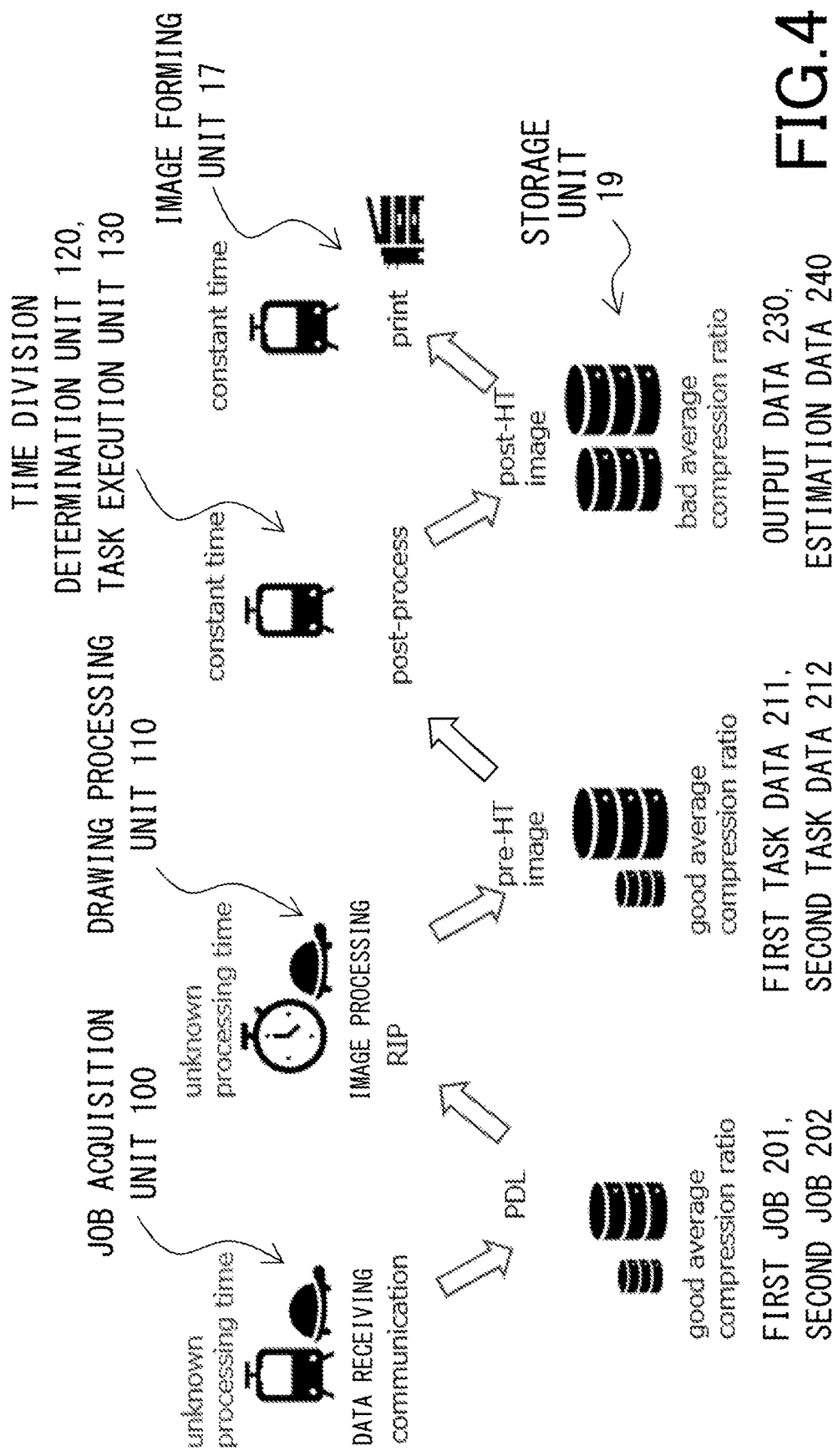
FIG. 4 is an overall conceptual diagram of the time-division task execution process as shown in FIG. 3.

Next, with reference to FIGS. 3 to 5, a time-division task execution process by the image forming apparatus 1 according to the embodiment of the present disclosure is described.

The time-division task execution process of the present embodiment acquires the first job 201 for the first task to be processed at the specific pace and the second job 202 for the second task to be processed at best effort. These first job 201 and second job 202 are divided into smaller work items, first band data 301 and second band data 302, respectively. In this state, which of the divided first band data 301 and the second band data 302 is to be executed is determined and switched based on the execution time. Then, halftone process for any of the switched first band data 301 and second band data 302 is executed in time division.

In the time-divided task execution process of the present embodiment, the control unit 10 and the image processing unit 11 mainly execute the program stored in the storage unit 19 in cooperation with each unit and use the hardware resources.

Hereinafter, the details of the time-division task execution process are described step by step with reference to the flowchart of FIG. 3.

(Step S101)

Firstly, the job acquisition unit 100 performs a job acquisition process.

According to FIG. 4, the job acquisition unit 100 acquires the first job 201 and the second job 202 from, for example, the terminal, or the like, via the network transmitting and receiving unit 15, and stores them in the storage unit 19. The acquisition start and completion times of the first job 201 and the second job 202 do not have to be simultaneous, and either of them may come first.

Alternatively, the job acquisition unit 100 may read the document by the document reading unit 12 or acquire it from a flash memory card, or the like, and input image data according to the user's instruction from the operation panel unit 16. Then, the image data may be stored in the storage unit 19 as the first job 201 and the second job 202, and the jobs such as the printing output and the printing cost estimation are set, respectively.

Alternatively, the job acquisition unit 100 may acquire the image data received by facsimile as the first job 201 and the second job 202 and store the image data in the storage unit 19.

(Step S102)

Next, the drawing processing unit 110 performs drawing process.

The drawing processing unit 110 performs RIP the first job 201 and the second job 202 stored in the storage unit 19 to generate the first task data 211 and the second task data 212, respectively. The first task data 211 and the second task data 212 are image data for intermediate process before halftone process (pre-HT). At this time, the drawing time by the drawing processing unit 110 may differ depending on the contents of the data of the first job 201 and the second job 202, and it may not be drawn at the same time.

As shown in FIG. 4, in the present embodiment, these processes are mainly executed by the control unit 10. However, the control unit 10 may perform RIP by using the function of the accelerator of the image processing unit 11.

As shown in element "A" in FIG. 5, an example of the first task data 211 and the second task data 212 output by this output process is shown. As shown in this example, these data may be divided into a plurality of first band data 301 and second band data 302, respectively, for each page. In this example, an example of dividing each page into four is shown.

(Step S103)

Here, the task execution unit 130 performs the first task band execution process.

In the present embodiment, the task execution unit 130 executes processing for the first band data 301. For example, the task execution unit 130 specifies the first task data 211 as a parameter setting and specifies a mode for actually printing, and thus it executes the printing process.

According to FIG. 4, in the present embodiment, for example, the task execution unit 130 performs halftone process. In this case, the task execution unit 130 generates data 230 of image data after halftone process (post-HT) in page units (unit size) and stores them in the storage unit 19. The output data 230 is image-formed and printed on recording paper at a constant pace. As described above, this constant pace depends on the speed of transporting the recording paper by the paper feed unit 14 and the image formation by the image forming unit 17.

In addition, the output data 230 may be converted into PDF, or the like, and transmitted to a terminal, or the like, or may be stored in a document box. Alternatively, the output data 230 may be facsimile-transmitted by the FAX transmitting and receiving unit 18.

(Step S104)

Next, the time division determination unit 120 determines whether or not it is in an interval between printing. Here, when the output of one page of the first band data 301 is completed in the processing of the first task, the waiting time for print output (free time or idle time) about several milliseconds to several minutes until the starting of outputting of the next page, that is, occurring the interval between printing pages. This is due to the printing of one page by the image forming unit 17, the transport time of the recording paper by the feeding unit 14, the preparation of the image forming process of the image forming unit 17, the processing of waste toner, the calibration, and the like. In the present embodiment, the waiting time for printing output is referred to as "an interval between printing". Further, this "interval between printing" is also an interval between the execution of the halftone process of the first band data 301, which is the work item of the first task. When the time division determination unit 120 detects that the progress of the process is in the interval between printing, it determines Yes. The time division determination unit 120 determines No in other cases, that is, during outputting the first task data 211.

In the case of Yes, the time division determination unit 120 advances the process to step S105.

In the case of No, the time division determination unit 120 returns the process to step S103 and proceeds with the process of the first task.

(Step S105)

If it is detected in the interval between printing, the time division determination unit 120 performs the second task switching process.

The time division determination unit 120 switches to the second task, which is a halftone process for the second band data 302. At the time of this task switching, the time division determination unit 120 switches the parameter to be processed for the second task. Further, in order to perform processing such as saving temporary data during execution of the first task, a preprocessing time about several milliseconds to several hundreds of milliseconds may be required. That is, the time division determination unit 120 selects the second task after the preprocessing time for switching the task, and it starts the execution by the task execution unit 130.

(Step S106)

Here, the task execution unit 130 performs the second task band execution process.

In the present embodiment, the task execution unit 130 performs printing cost estimation process as the second task. The task execution unit 130 estimates the amount of ink and toner in the estimation of the printing cost. This prediction is made by actually processing the second task data 212 until just before printing. Specifically, as this second task, the task execution unit 130 performs halftone process on the second band data 302, but it does not output the data to the image forming unit 17 and only counts the data. Therefore, since the second task does not be affected by the speed of image formation by the image forming unit 17, it can be executed in the interval between printings. In addition, the task execution unit 130 can perform processing in units of second band data 302 as work items in which pages are divided. That is, the task execution unit 130 can execute the process with the unit size of the second band data 302 unit instead of the unit size of the page unit.

Here, in the present embodiment, the processing procedures of the first task and the second task are the same, and only the parameters at the time of execution are different.

That is, for example, by indicating the second task data 212 and designating the mode of "printing cost estimation" as a parameter setting, the task execution unit 130 is made to execute the second task. Specifically, the task execution unit 130 can count the number of dots (pixels) of the second band data 302, or the like, and calculate the printing cost.

The task execution unit 130 outputs this result to the estimation data 240 and stores it in the storage unit 19.

(Step S107)

Next, the time division determination unit 120 determines whether or not it is in the timing to be switched. Here, firstly, the time division determination unit 120 determines whether or not it is in the timing when the execution of one work item of the second task is completed. In the present embodiment, the time division determination unit 120 determines whether or not it is the timing when the count for one of the second band data 302 is completed even if the output in page units is not completed. If it is the timing when this count is finished, secondly, the time division determination unit 120 further calculates whether or not it is the timing at which the printing the page is not delayed. If it is at the timing, the time division determination unit 120 determines Yes because it is the switching timing. The timing at which the printing of the page is not delayed may be, contrary, for example, the timing at which the printing of the page will be delayed if the next second band data 302 is processed. The time division determination unit 120 can also consider the waiting time for processing another task when calculating this timing. This other task is, for example, a task such as image compression. Further, in other cases, the time division determination unit 120 determines No.

In the case of Yes, the time division determination unit 120 advances the process to step S108.

If the case of No, the time division determination unit 120 returns the process to step S106 and causes the process of the second task to proceed. As a result, the processing of the second band data 302 can be executed until the processing on the first task side is ready.

(Step S108)

If it is the switching timing, the time division determination unit 120 determines whether or not the first task is completed. The time division determination unit 120 determines Yes if all the pages of the first task data 211 have already been output, that is, the first task is completed. The time division determination unit 120 determines No if the page to be output still remains in the first task data 211, that is, the first task is not completed.

In the case of Yes, the time division determination unit 120 advances the process to step S110.

In the case of No, the time division determination unit 120 advances the process to step S109.

(Step S109)

If the first task is not completed, the time division determination unit 120 performs the first task switching process.

The time division determination unit 120 switches from the second task to the first task. At this time, the time division determination unit 120 performs processing such as saving temporary data during execution of the second task in the storage unit 19. This preparation also takes time to switch tasks. Then, the time division determination unit 120 selects and switches the first task.

After that, the time division determination unit 120 returns the process to step S103, and it causes the task execution unit 130 to restart the output of printing by the first task.

(Step S110)

When the first task is completed, the time division determination unit 120 determines whether or not the second task is completed. The time division determination unit 120 determines Yes if all the pages of the second task data 212 have already been output. In other cases, the time division determination unit 120 determines No.

In the case of Yes, the time division determination unit 120 ends the time-division task execution process.

In the case of No, the time division determination unit 120 returns the process to step S106, and it causes the task execution unit 130 to continue counting in the second task.

As described above, the time-division task execution process according to the embodiment of the present disclosure is completed.

As configured in this way, the following effects can be obtained.

In the typical technology, when executing a cost estimation task, it is executed after all printing tasks are completed. That is, if the print job to actually print is under execution, the printing cost cannot be estimated.

However, if the printing cost is estimated after waiting the completion of image formation, the processing time is longer, and the efficiency is poor.

On the other hand, in the image forming apparatus 1 according to the embodiment of the present disclosure includes: a time division determination unit 120 that determines and switch which of first band data 301 and the second band data 302 to execute based on execution time in a condition where at least one first task to be processed at a specific pace and at least one second task to be processed at best effort are respectively divides into smaller work items; a task execution unit 130 that executes either of the first band data 301 and the second band data 302 switched by the time division determination unit 120 in a time division manner; and an image forming unit 17 that forms an image based on output data 230 generated from the first band data 301, which is the work item of the first task processed by the task executing unit 130.

With this configuration, the image processing unit 11 can be performed processing even in the free time of image formation executed in real time. That is, when the first task such as the print process is being executed, it is possible to switch to the second task such as the calculation of the print cost and execute the process in a time-division manner in parallel at the same time. As a result, the processing time can be reduced, the second task can be processed quickly at best effort, and the processing efficiency can be improved.

Further, in the image forming apparatus 1 according to the embodiment of the present disclosure, the processing procedure of the first task and the second task is the same, and only the parameters at the time of execution are different.

With this configuration, the computational resources of the image processing unit 11 can be effectively utilized. In addition, since it is not necessary to prepare different codes for the first task and the second task, the time and effort for switching can be reduced. Furthermore, the accuracy of the count can be insured by performing the best effort processing with the same code of the constant pace processing.

Further, since typical image processing task is affected by many shared resources, the completion time of each task cannot be accurately predicted. Therefore, if the tasks are simply switched in a certain period of time, on the contrary, the processing efficiency may decrease.

On the other hand, in the image forming apparatus 1 according to the embodiment of the present disclosure, the time division determination unit 120 selects the second task if it is in the interval between the execution of the halftone processing for the first band data 301 of the first task.

With this configuration, the computational resources of the image processing unit 11 can be fully utilized, and, in addition, the printing cost can be efficiently counted during the actual image formation. Further, the processing of the second task can be executed with best effort, efficiently, simultaneously in parallel in the interval between the executions of the first task.

Further, in the image forming apparatus 1 according to the embodiment of the present disclosure, the first task and the second task are processes related to printing.

With this configuration, in image processing such as halftone process in printing, another processing can be executed in the interval while maintaining the minimum speed of the priority processing.

Further, in the image forming apparatus 1 according to the embodiment of the present disclosure, the first task is a normal printing process, the second task is a printing cost estimation process, the interval between the executions is between the printing of pages; and the time division determination unit 120 switches to execution of the first band data 301 in the first task at a timing in which printing of the page is not delayed after any of the second band data 302 in the second task is executed.

With this configuration, the cost estimation task can be effectively assigned to the interval between printing of pages, which is executed at a constant pace. This ensures that the cost estimation task is completed faster.

Further, in the image forming apparatus 1 according to the embodiment of the present disclosure, the first task data 211 and the second task data 212 are image data after RIP and before halftone process (pre-HT).

With this configuration, the raster image data after RIP can be temporarily stored in the state with the highest compression rate. In addition, unlike PDL, and the like, such as the first job 201 and the second job 202, the raster image data has less variation in processing time, and it becomes easy to predict the processing end time. In addition, such pre-HT image data can be appropriately processed in real time and simultaneously in parallel in accordance with image formation. Thus, a plurality of image processing tasks can be efficiently executed while saving the storage capacity of the storage unit 19. Therefore, it is possible to have flexibility in switching processes, or the like.

OTHER EMBODIMENTS

In the above-described embodiment, an example in which the first band data 301 and the second band data 302 in "band" units are used as the work items of the first task data 211 and the second task data 212 has been described.

However, it is also possible to use the divided data as the work item in a unit different from the "band" as the first task data 211 and the second task data 212. Specifically, for example, the first task data 211 and the second task data 212 can be divided into work items according to the capacity of the GPU cache memory, the work memory, or the like. Further, the number of divisions may also be changed depending on the storage capacity, the page size, the resolution, the number of colors, or the like, for the first task data 211 and the second task data 212.

With such a configuration, image processing can be performed, flexibly, according to the configuration of the image processing unit 11, or the like.

Further, in the above-described embodiment, the example in which the first task to be processed at the specific pace is the halftone process of the first job 201, which is a normal printing job for printing on a designated recording paper, is described.

However, the first task may be post-processing of printing, scanning processing, or the like, which need to be processed at the specific pace. In this case as well, the second task may be executed in a state of being divided into smaller work items in the interval between post-processing or scanning processing for each page.

Further, in the above-described embodiment, an example is described in which the second task to be processed at the best effort is the printing cost estimation process.

However, this second task may also be cost estimation processing such as post-processing, scanning processing, or the like. Further, even in the printing cost estimation process, as the above-mentioned counting, estimating the consumption of other consumables or estimating about equipment depreciation such as estimation of replacement parts may be performed.

With this configuration, the cost according to the user's needs can be estimated.

In addition, the second task may be estimation of the requiring time and consuming resources for the second job 202. The estimation of the requiring time and consuming resources may be, for example, an estimation of the end time of the second job, an estimation of the impact on the common resource by starting the second job, or the like. The estimation of the impact may be, for example, the usage rate of the control unit 10, the image processing unit 11, the storage unit 19, and the like.

With this configuration, the impact on other jobs can be estimated, and jobs can be executed more efficiently.

Further, in the above-described embodiment, an example in which the second band data 302 is generated and the cost is estimated for all the pages of the second job 202 is described.

However, the second job 202 may be partially estimated. For example, for the second job 202 including repetitive factors such as number of copies printing and variable printing, it is not necessary to actually form an image, so it is possible to estimate the cost only for the repetitive amount. That is, it is possible to perform processing such as counting only a part to be repeatedly processed and multiplying the counting result by the number of repetitions to be estimated.

Further, the second job 202, which is not repeated or is not clear to be repeated, may be counted by sampling several page from the first page, a specific page, or a band data. In this case as well, it is possible to estimate by multiplying by the number of pages or the number of bands.

With this configuration, the execution of the second task can be completed at a higher speed between the executions of the first task.

Further, in the above-described embodiment, an example of switching between the first task related to the first job 201 and the second task related to the second job 202 has been described.

However, as a task to be processed at a specific pace, it may be possible to switch to at least one second task or to another task of best effort between executions for the other tasks. Further, it may be possible to switch between a plurality of tasks of a plurality of jobs in a relationship such as the first task or the second task. Further, it can switch a plurality of second tasks for one first task or switch one second task for a plurality of first tasks.

With this configuration, the image processing unit 11 can flexibly be switched among the necessary tasks.

Further, in the above-described embodiment, an example in which the image processing unit 11 executes one task in the SIMD has been described.

However, a large number of arithmetic units may be divided into multiple groups and executed simultaneously, and tasks may be assigned to each group. In this case, the number of arithmetic units assigned to the task may be dynamically increased or decreased during execution. Alternatively, the number of arithmetic units may be changed between the first task and the second task.

Further, although the above-mentioned first task and second task have described an example of being a "task" by the code data 220, they may be different execution units such as threads and batch processing, not the unit of so-called OS task. Further, the time division determination unit 120 may be implemented in a format such as a subroutine or a class at the time of program execution, instead of the task switcher of the OS, or the like. More specifically, in the image processing unit 11, the binary code may be directly executed, and the high-level OS may not be executed.

Further, in the above-described embodiment, although an example that the image processing unit 11 is a single is described, a configuration can be available that a plurality of image processing units 11 is provided and is switched each of them physically or circuit-wise, or the like. At this time, it is also possible to use a custom hardware dedicated for switching, ASIC, or FPGA. Further, it is possible to switch between the GPU and the ASIC or FPGA, or switch between the ASICs and FPGAs themselves.

Further, in the above-described embodiment, an example in which the image processing apparatus is the image forming apparatus 1 is described.

However, it is also possible to use an image processing apparatus other than the image forming apparatus 1. The image processing apparatus may be, for example, a server for image processing, a user's terminal, a GPU box externally connected by a Thunderbolt (registered trademark), or the like.

With such a configuration, to support a more flexible configuration is possible.

Further, the present disclosure can be applied to an information processing apparatus other than the image forming apparatus. That is, a network scanner, a server to which the scanner is separately connected by USB, or the like, may be used.

Further, it is needless to say that the configuration and operation of the above-described embodiment are examples and can be appropriately modified and executed without departing from the aim of the present disclosure.

What is claimed is:

1. An image processing apparatus that performs image processing related to image formation of an image forming apparatus, comprising:
   a time division determination unit configured to determine and switch which of divided work items to execute based on execution time in a condition where at least one first task to be processed at a specific pace and at least one second task to be processed at best effort are respectively divided into smaller work items; and
   a task execution unit configured to execute the work item switched by the time division determination unit in a time division manner; wherein
   the time division determination unit selects the second task in an interval between the execution of the work items of the first task;
   the first task is a normal printing process,
   the second task is a printing cost estimation process,
   the interval between the executions is between the printing of pages; and
   the time division determination unit switches to execution of the work item of the first task at a timing in which printing of a page of the pages is not delayed after the work item of the second task is executed.

2. The image processing apparatus according to claim 1, wherein
   the processing procedure of the first task and the second task is the same, and only a parameter at time of execution is different.

3. The image processing apparatus according to claim 1, wherein
   the first task and the second task are processes related to printing.

4. An image forming apparatus comprising:
   a time division determination unit configured to determine and switch which of divided work items to execute based on execution time in a condition where at least one first task to be processed at a specific pace and at least one second task to be processed at best effort are respectively divided into smaller work items;
   a task execution unit configured to execute the work item switched by the time division determination unit in a time division manner; and
   an image forming unit that forms an image based on output data generated from the work item of the first task processed by the task executing unit;
   wherein
   the time division determination unit selects the second task in an interval between the execution of the work items of the first task;
   the first task is a normal printing process,
   the second task is a printing cost estimation process,
   the interval between the executions is between the printing of pages; and
   the time division determination unit switches to execution of the work item of the first task at a timing in which printing of a page of the pages is not delayed after the work item of the second task is executed.

5. The image forming apparatus according to claim 4, wherein
   the processing procedure of the first task and the second task is the same, and only a parameter at time of execution is different.

6. The image forming apparatus according to claim 4, wherein
   the first task and the second task are processes related to printing.

7. An image processing method executed by an image processing apparatus that performs image processing related to image formation of an image forming apparatus, comprising the steps of:
   determining and switching which of divided work items to execute based on execution time in a condition where at least one first task to be processed at a specific pace and at least one second task to be processed at best effort are respectively divided into smaller work items; and
   executing the switched work item in time division; and
   selecting the second task in an interval between the execution of the work items of the first task; wherein
   the first task is a normal printing process,
   the second task is a printing cost estimation process,
   the interval between the executions is between the printing of pages; and
   the method comprises switching to execution of the work item of the first task at a timing in which printing of a page of the pages is not delayed after the work item of the second task is executed.

8. The image processing method according to claim 7, wherein
   the processing procedure of the first task and the second task is the same, and only a parameter at time of execution is different.

9. The image processing method according to claim 7, wherein
   the first task and the second task are processes related to printing.

* * * * *